United States Patent
Wang et al.

(10) Patent No.: US 12,507,287 B2
(45) Date of Patent: Dec. 23, 2025

(54) PERMISSION-BASED NETWORK SLICE SELECTION

(71) Applicant: GOOGLE LLC, Mountain View, CA (US)

(72) Inventors: Jibing Wang, San Jose, CA (US); Ning Zhang, Saratoga, CA (US); Pavan S. Nuggehalli, San Carlos, CA (US); Sathish Karunakaran, Los Altos, CA (US); Robert J. Greenwalt, III, Woodside, CA (US); Stella Loh, Los Altos, CA (US); Hassan Sipra, Mountain View, CA (US); Ankur Jain, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 400 days.

(21) Appl. No.: 18/016,208

(22) PCT Filed: Jul. 16, 2021

(86) PCT No.: PCT/US2021/041963
§ 371 (c)(1),
(2) Date: Jan. 13, 2023

(87) PCT Pub. No.: WO2022/016050
PCT Pub. Date: Jan. 20, 2022

(65) Prior Publication Data
US 2023/0276352 A1  Aug. 31, 2023

Related U.S. Application Data

(60) Provisional application No. 63/053,065, filed on Jul. 17, 2020.

(51) Int. Cl.
*H04W 76/10* (2018.01)
*H04L 41/0894* (2022.01)
(Continued)

(52) U.S. Cl.
CPC ......... *H04W 76/10* (2018.02); *H04L 41/0894* (2022.05); *H04L 41/0895* (2022.05);
(Continued)

(58) Field of Classification Search
CPC ..... H04W 76/10; H04W 40/02; H04W 48/18; H04W 28/24; H04W 72/02; H04W 76/12;
(Continued)

(56) References Cited

U.S. PATENT DOCUMENTS 10,602,422 B1   3/2020   Jagannatha et al.
10,863,556 B2 * 12/2020  Lau ................. H04W 48/10
(Continued)

FOREIGN PATENT DOCUMENTS

WO   WO-2018034924 A1 *  2/2018   ........... H04W 36/06
WO   2020091636 A1   5/2020
WO   2020252281 A1   12/2020

OTHER PUBLICATIONS

International Search Report and Written Opinion mailed Oct. 28, 2021 for corresponding International Application No. PCT/US2021/041963, 15 pages.
(Continued)

*Primary Examiner* — Julio R Perez (57) ABSTRACT

A user equipment (UE) is configured to request connection to a selected one of a plurality of available network slices of a network system. The UE implements a permission control framework that allows individual applications to request connection to the selected network slice, but establishes the connection only when the framework determines, based on any of a variety of permission criteria, that the application is permitted to access the requested network slice. The UE also supports user selection of the network slice via a graphical user interface that presents a selectable list of available network slices.

21 Claims, 4 Drawing Sheets

(51) Int. Cl.
  *H04L 41/0895*   (2022.01)
  *H04L 41/40*     (2022.01)
  *H04W 40/02*     (2009.01)
  *H04W 48/18*     (2009.01)
  *H04L 43/20*         (2022.01)

(52) U.S. Cl.
  CPC ............ *H04L 41/40* (2022.05); *H04W 40/02* (2013.01); *H04W 48/18* (2013.01); *H04L 43/20* (2022.05)

(58) Field of Classification Search
  CPC ........... H04W 28/0268; H04L 41/0894; H04L 41/0895; H04L 41/40; H04L 43/20; H04L 43/0805; H04L 43/0858; H04L 43/0876; H04L 41/0806; H04L 41/5041; H04L 41/22; H04L 45/306
  See application file for complete search history.

(56) References Cited

U.S. PATENT DOCUMENTS

| | | | | |
|---|---|---|---|---|
| 12,028,798 | B2 * | 7/2024 | Welin | .................... H04L 1/1896 |
| 2017/0317894 | A1 | 11/2017 | Dao et al. | |
| 2017/0318450 | A1 * | 11/2017 | Salkintzis | ............. H04W 48/14 |
| 2019/0053104 | A1 | 2/2019 | Qiao et al. | |
| 2019/0357136 | A1 | 11/2019 | Li | |
| 2020/0053622 | A1 | 2/2020 | Huang-Fu et al. | |
| 2020/0120721 | A1 | 4/2020 | Lau et al. | |
| 2020/0169921 | A1 | 5/2020 | Zhu et al. | |
| 2020/0187085 | A1 * | 6/2020 | Jagannatha | ......... H04L 41/5041 |
| 2021/0392575 | A1 * | 12/2021 | Welin | .................... H04W 48/18 |
| 2022/0272621 | A1 * | 8/2022 | Takakura | ................ H04W 8/22 |
| 2022/0312307 | A1 * | 9/2022 | Koshta | .................. H04W 60/06 |
| 2023/0048803 | A1 * | 2/2023 | Godin | .................. H04W 48/16 |
| 2023/0081061 | A1 * | 3/2023 | Yang | .................. H04L 43/0876 |
| | | | | 455/414.1 |
| 2023/0156585 | A1 * | 5/2023 | Lee | ....................... H04W 24/02 |
| | | | | 370/329 |
| 2023/0209491 | A1 * | 6/2023 | Zhang | .................. H04W 60/04 |
| | | | | 455/435.1 |
| 2023/0276352 | A1 * | 8/2023 | Wang | .................. H04L 41/0894 |
| | | | | 455/434 |
| 2023/0345333 | A1 * | 10/2023 | Kim | .................. H04L 65/1069 |
| 2023/0388909 | A1 * | 11/2023 | Hedman | ................. H04W 8/08 |
| 2024/0064776 | A1 * | 2/2024 | Wang | .................... H04W 76/14 |

OTHER PUBLICATIONS

Communication Pursuant to Article 94(3) EPC mailed on Jan. 10, 2025 for EP Application No. 21749977.1, 6 pages.

International Preliminary Report on Patentability mailed on Jan. 26, 2023 for PCT Application No. PCT/US2021/041963, 9 pages.

* cited by examiner

PERMISSION-BASED NETWORK SLICE SELECTION

CROSS-REFERENCE TO RELATED APPLICATIONS

The present application is a U.S. National Stage under 35 U.S.C. § 371 of International Patent Application Serial No. PCT/US2021/041963, entitled "PERMISSION-BASED NETWORK SLICE SELECTION" and filed on Jul. 16, 2021, which claims priority to U.S. Provisional Application No. 63/053,065, entitled "PERMISSION-BASED NETWORK SLICE SELECTION" and filed on Jul. 17, 2020, the entireties of which are incorporated by reference herein.

BACKGROUND

Network providers continue to enhance network infrastructure and architectures to provide improved bandwidth, reliability, and network features. To support these enhancements, network providers implement improved Radio Access Networks (RANs), such as Fifth Generation (5G) cellular networks, that provide connections between user equipment (UE) and one or more core networks. To further enhance the network, the core network and the RAN (e.g., a 5G system including both the 5G RAN and 5G core network) can be configured to implement network slicing, wherein the RAN and the core is logically divided into a set of virtual networks referred to as network slices. Each network slice can employ different portions of the underlying physical architecture of the 5G system to implement a specified set of network characteristics, such as latency characteristics, security characteristics, and the like. Network slicing thereby allows network providers to implement different virtual networks with different capabilities, different pricing structures, and other characteristics to provide more service options for customers.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

FIGS. 1-5 illustrate techniques for requesting, at a UE, connection to a selected one of a plurality of available network slices of a network system including a RAN and a core network, such as a 5G system. In some embodiments, the UE implements a permission control framework that allows individual applications to request connection to the selected network slice, but establishes the connection only when the framework determines, based on any of a variety of permission criteria, that the application is permitted to access the requested network slice. In some embodiments, the UE supports user selection of the network slice via a graphical user interface (GUI) that presents a selectable list of available network slices. By supporting one or both of user and application selection of a network slice, the UE provides for more flexibility and control over the UE's connection to the network system, and the network system may be efficiently utilized. Techniques described herein may allow for a network connection between a UE and a network system to be adapted to the demands and sensitivities of the UE, such as the demands and sensitivities of a particular application of the UE. User experience of the UE may be improved.

To illustrate, in some cases different applications have varying sensitivities to different characteristics of the UE's network connection. For example, the performance of one application may be particularly dependent on the latency associated with the network connection, while a different application is relatively insensitive to latency, but depends more on the level of security supported by the network connection. However, network providers conventionally assign a network slice to a particular UE in a relatively fixed and inflexible fashion, such as based on a particular service plan associated with an owner or user of the UE. Assigning a network slice in this way does not account for variables such as the characteristics of an executing application, the requirements of a particular user, and the like. Using the techniques disclosed herein, the UE can request to connect to a particular network slice based on the application that is communicating via the network slice, based on a user permission for an application to select the network slice, or any combination thereof. The UE thereby allows different applications or users to connect to different network slices according to the characteristics of the application or user, thus optimizing the utilization of network slices within the network system, improving application performance, and improving the overall user experience with the UE.

To illustrate further via an example, in one embodiment a UE executes an application that is sensitive to network latency—that is, the application performs better when connected to the network via a low-latency connection. Using the techniques disclosed herein, the latency-sensitive application can request connection to a low-latency network slice of the network system. Based on the request, the UE can establish a connection to the requested low-latency network slice, thereby improving performance of the latency-sensitive application. Subsequently, the UE can execute a security-sensitive application that is associated with communicating secure data (e.g., an e-mail application or a specific business-related application). The security-sensitive application can request connection to a high-security network slice that is different from the low-latency network slice. Based on the request, the UE establishes connection to the requested high-security network slice, thereby protecting data associated with the security-sensitive application. Thus, using the techniques described herein, different applications can request connection to different network slices in order to tailor the network connection to the demands and sensitivities of the corresponding application, thereby improving application performance.

In some cases, a network carrier or other entity may wish to limit access by applications or users to one or more network slices. For example, different network slices may be associated with different network charging rates, and a carrier may wish to restrict access to network slices associated with higher charging rates to users on a specified service plan. Accordingly, to control access to the one or more network slices, the UE can implement a framework that enforces permission-based access restrictions to the different network slices. For example, the framework can restrict access to one or more of the network slices based on permission criteria such as user-based criteria, enterprise-based criteria, carrier-based criteria, and application-based criteria. In response to an application requesting access to a network slice, the framework determines whether the application has permission, as indicated by the permission criteria, to access the requested slice. If not, the framework prevents the application from accessing the network slice. If the application does have permission to access the requested network slice, the framework communicates with the modem of the UE to establish a communication session for the application with the requested network slice. The framework thereby ensures that access to each network slice is permitted only to those applications indicated by the permission criteria for the network slice. This allows a user, enterprise, carrier, application developer, or any combination thereof, to flexibly control access to different network slices, allowing the corresponding network to better utilize the different network slices and support a wider variety of network services, service plans, access costs, and the like.

In some embodiments, instead of or in addition to the permission-based access implemented by the framework, the UE allows a user to directly select, via a GUI or other interface, which network slice is accessed by one or more of the applications executing at the UE. For example, the UE can query the network system for a set of available network slices and can display, via the GUI, a selectable list of the network slices, together with selection information such as network characteristics (e.g., latency, bandwidth, security) associated with each slice, a cost (e.g., a network charging cost) associated with each slice, and the like. The user can select one of the available slices via the GUI, and in response the UE connects one or more applications executing at the UE to the selected network slice. In some embodiments, the user can select, via the GUI, whether a selected application has permission to request a particular network slice.

Figure 1:
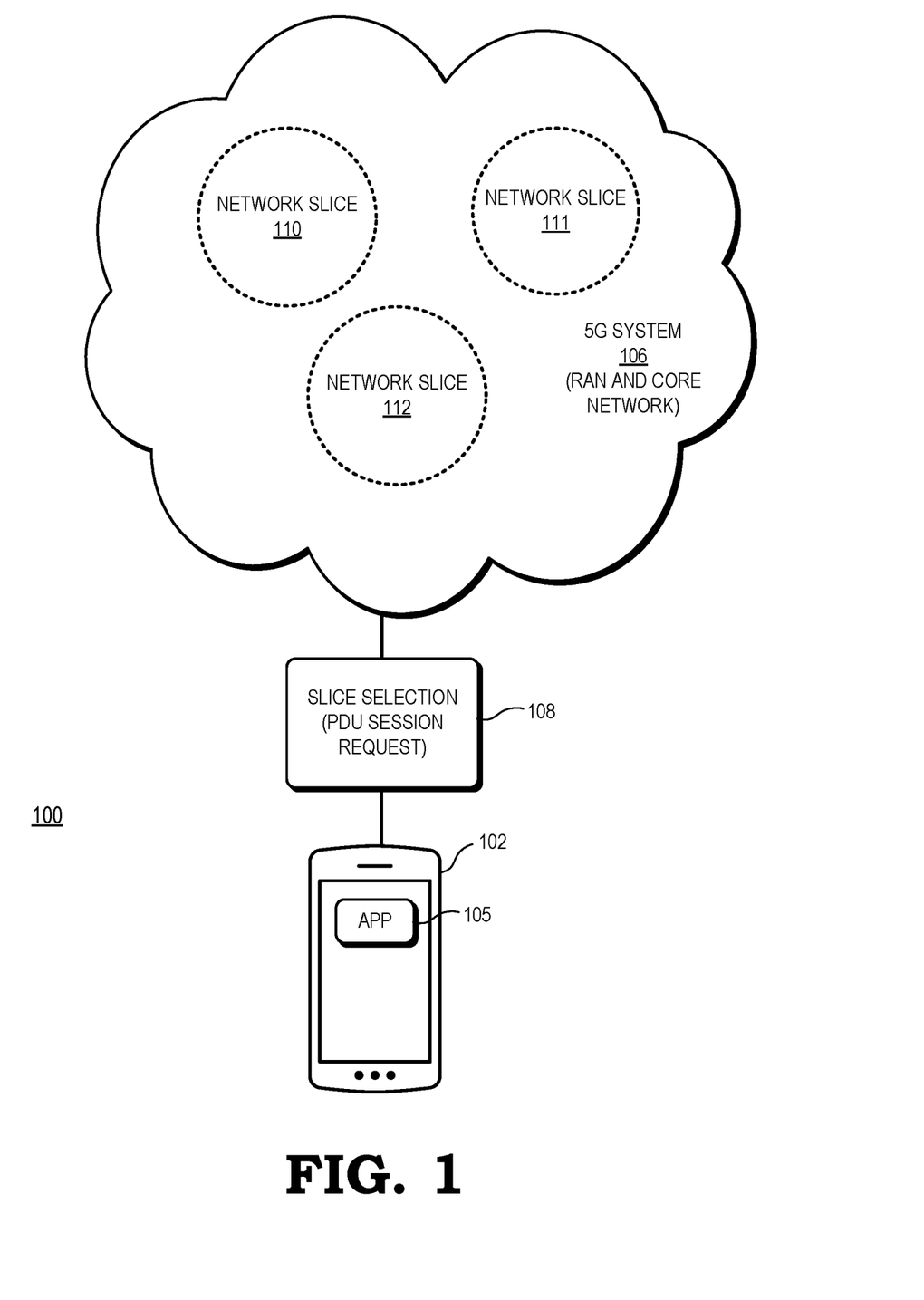
FIG. 1 is a block diagram of a communication network that supports permission-based UE selection of network slices of a radio access network in accordance with some embodiments.

Turning to the Figures, FIG. 1 illustrates a communication system 100 that supports network slice selection based on user or application requests in accordance with some embodiments. In the illustrated example, the communication network 100 includes a UE 102, and a network system 106. The UE 102 is illustrated as a smartphone, but in other embodiments can be any device having a modem, network interface, or other device that supports connection to a RAN. For example, in some embodiments the UE 102 is a smartphone that includes a modem to connect to the network system 106 via an air interface. In other embodiments, the UE 102 can be a different type of device having a similar modem, such as a tablet, a computer device such as a desktop or laptop computer, a game console, and the like.

The network system 106 is a set of networks including a core network and a radio access network (RAN). The core network is a network that provides communication services for the UE 102, such as aggregation services, authentication services, call control and switching, service invocation and charging services, and the like. In some embodiments, the core network can also provide a gateway for the UE 102 to communicate with other networks, such as the Internet.

The network system 106 is a Radio Access Network including a set of equipment that is configured to connect UEs, such as the UE 102, to the core network according to the specifications of a corresponding Radio Access Technology (RAT). In the depicted example, the network system 106 is an network that complies with a Fifth Generation (5G) wireless communication protocol, and therefore includes network equipment to support connection of the UE 102 to the core network according to the 5G protocol, including one or more Next Generation NodeB (gNB) devices. The UE 102 connects to the network system 106 via one or more carrier signals, wherein the frequency of the carrier signals is specified by the network protocol of the network system 106. It will be appreciated that although the network system 106 is assumed to be a 5G network system for purposes of description, the techniques described herein can apply to any network system that implements network slicing.

The network system 106 is configured to support a plurality of network slices, such as network slices 110, 111, and 112. Each network slice is a virtual network implemented by the underlying physical hardware of the network system 106. Further, the network equipment of the network system 106 is configured to logically separate the network slices 110, 111, and 112, and to virtualize the corresponding hardware elements so that each network slice appears to user equipment, such as the UE 102, as a separate network. That is, the UE 102 can establish a connection, such as a protocol data unit (PDU) session, to each of the network slices 110-112 individually via a connection negotiation process defined by the communication protocol of the network system 106. Further, the UE 102 can communicate (send and receive) data, according to the communication protocol of the network system 106, via an individual network slice as if that network slice were an independent network. To establish a connection with a given network slice, the UE 102 sends a slice request 108 (e.g., a PDU session request) to the network system 106, indicating the network slice for which a connection is requested. In response, the network system 106 negotiates, according to the specified network protocol, a communication session between the UE 102 and the network slice indicated by the slice request.

In some embodiments, the UE 102 can establish concurrent connections with multiple ones of the network slices 110-112 by sending multiple instances of the slice request 108, each instance identifying a different application, different network slice, or any combination thereof. For example, in some embodiments the UE 102 can establish a connection between one of the network slices 110-112 (e.g., network slice 111) and an executing application (e.g., application 105), and establish a different connection between a different one of the network slices 110-112 (e.g., network slice 112) and a different, concurrently executing application. Each application communicates data with the core network 104 via its corresponding network slice. Moreover, in some embodiments the application 105 can generate multiple communication streams, and the UE 102 can establish concurrent connections for different ones of the communication streams to different corresponding ones of the network slices 110-112. The UE 102 communicates data for a given stream via the network slice to which the stream is connected.

In some embodiments, each of the network slices 110, 111, and 112 is associated with different network characteristics, based on the hardware elements that compose the network slice. Examples of the different characteristics can include latency, bandwidth, security, a carrier label, a charging rate (e.g. a cost associated with communicating data via the network slice), and the like, or any combination thereof. For example, in some embodiments the network 110 is a low-latency network slice that supports relatively low-latency communications, and has a relatively high charging rate, while the network slice 111 is a high-latency network slice supporting relatively higher latency communications and has a relatively low-charging rate. To support enhanced flexibility and an improved user experience, the UE 102 allows one or more of a user of the UE 102 and an application executing at the UE 102 to request connection to an individual one of the network slices 110-112.

For example, at one or more specified points in time, such as when the UE 102 first establishes a connection with the network system 106, the network system 106 can provide the UE 102 with a list of available network slices. In response to a user request (e.g., a user interacting with an operating system or other executing program), the UE 102 can display a selectable list of the available network slices, along with one or more network characteristics associated with each of the available network slices, such as the latency associated with each slice, the bandwidth associated with each slice, the charging cost associated with each network slice, and the like, or any combination thereof. In response to the user selecting a network slice from the selectable list, the UE 102 generates the slice request 108 to establish a connection with the selected network slice. The user is thus provided control over which of the network slices 110-112 is used by the UE 102 to communicate with the core network 104, allowing different users to select the network slice that best suits their needs. For example, a more cost-sensitive, and less performance-sensitive, user can select the network slice associated with a lower charging rate and higher latency, while a less cost-sensitive, and more performance-sensitive user, can select the network slice associated with a higher charging rate.

In some embodiments, the application 105 can request connection to one of the network slices 110-112 in order to connect to a network slice that is expected to support improved performance of the application 105. For example, a game application may expect improved performance when connected to a network slice having a low-latency characteristic. Accordingly, the game application can generate a request to connect to the one of the network slices 110-112 associated with the lowest latency. In response to the request, the UE 102 can generate the slice request 108 to connect to the network slice identified by the application.

In some embodiments, the application 105 does not itself request connection to a specific one of the network slices 110-112, but instead specifies to the UE 102 one or more characteristics of the network slice to which the application 105 wishes to connect, such as that the network slice is low latency, that the network slice is unmetered, and the like. In response, the UE 102 identifies the one of the network slices 110-112 that most closely matches the specified characteristics and generates the slice request 108 to connect to the identified network slice.

As noted above, in some cases it is desirable for a user, carrier, enterprise, application developer, or other entity, or a combination thereof, to restrict access by one or more applications to one or more of the network slices 110-112. Accordingly, in some embodiments the UE 102 supports a permission-based access framework that regulates which application request results in generation of a slice request 108. In some embodiments, the framework is implemented by an operating system and associated hardware at the UE 102. The framework employs permission criteria to ensure that the slice request 108 is not issued in response to an application request unless the application has permission, as indicated by stored permission criteria, to access the requested network slice. For example, in response to a request from an application to access the network slice 110, the framework accesses the permission criteria to determine whether the requesting application has permission to access the requested network slice. If not, the framework notifies the application that the request is denied, and the framework does not issue the slice request 108. In response to determining that the application does have permission to access the network slice, the framework instructs a modem of the UE 102 to issue the slice request 108.

The permission criteria can be set by any of a number of entities, or a combination thereof. For example, in some embodiments the permission criteria includes one or more of user-based criteria set by a user of the UE 102, enterprise-based criteria established by an enterprise that issued the UE 102 to the user, carrier-based criteria set by a network carrier associated with the network system 106 or the core network 104, application-based criteria set by a developer of the application, and the like, or any combination thereof. To illustrate, in some embodiments, the permission criteria are set by a user to ensure that one or more specified applications do not access higher cost network slices (that is, network slices associated with higher charging rates). In other embodiments, the permission criteria are set by the application developer to ensure that an application requiring low-latency communications connects to a network slice associated with relatively low latency. In still other embodiments, the permission criteria are set by the carrier to ensure that a user on a relatively low-cost service plan does not access network slices associated with higher charging rates. In yet other embodiments, the permission criteria are set by an enterprise to ensure that an application associated with sensitive enterprise functions connects to a network slice associated with relatively high-security features. Thus, the permission criteria allow different entities to control access to the network slices 110-112, providing more control and flexibility to each entity.

Figure 2:
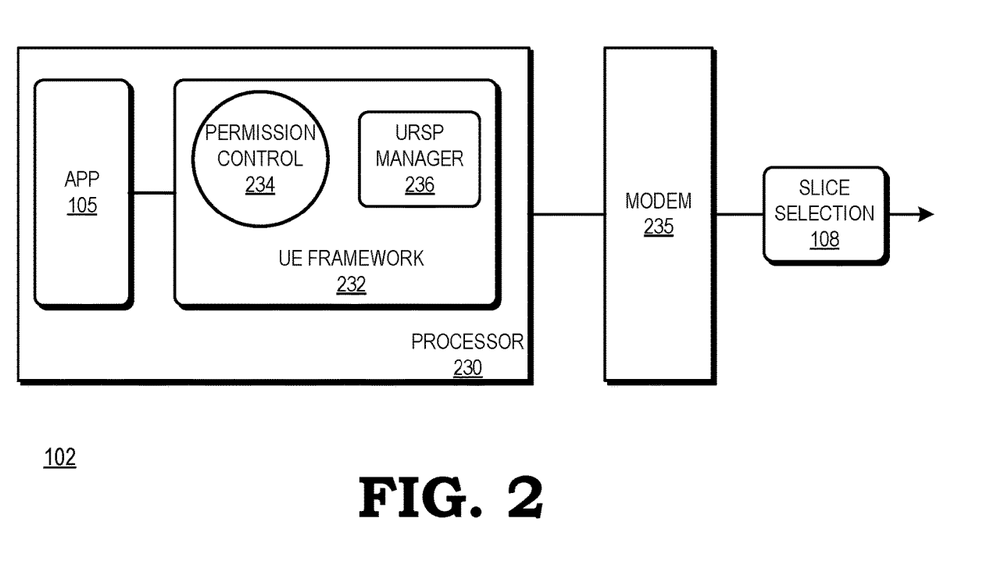
FIG. 2 is a block diagram illustrating an example of the UE of FIG. 1 in accordance with some embodiments.

FIG. 2 illustrates a block diagram of the UE 102 in accordance with some embodiments. In the illustrated embodiment, the UE 102 includes a processor 230 and a modem 235. The processor 230 is a general-purpose or application-specific processor generally configured to execute sets of instructions (e.g. applications, an operating system, and the like) to carry out operations on behalf of the UE 102. The modem 235 is a module configured to perform at least the physical (PHY) layer and logical layer operations to connect the UE 102 with the network system 106. In the illustrated example, the processor 230 executes the application 105, as well as framework 232.

The framework 232 is software, hardware, or a combination thereof that is generally configured to manage connection of the UE 102 to the network system 106. In some embodiments, the framework 232 is implemented by an operating system of the UE 102. With respect to managing connections to the network slices 110, 111, and 112, the framework 232 is configured to receive network requests from the application 105 and to employ a permission control module 234 to determine whether the application is permitted to access the requested network slice. The permission control module 234 is software or hardware, or a combination thereof, that compares aspects of a network request to stored permission criteria to determine whether the application that issued the network request is permitted to access an available network slice that matches the network request.

To illustrate, in some embodiments the application 105 issues, via a connectivity application program interface (API) such as a NET_CAP_XXX API, a network request to connect to a network slice. In some embodiments, the network request identifies a specific one of the network slices 110, 111, and 112 by providing a network slice identifier corresponding to the requested network slice. In other embodiments, the network request does not identify a specific network slice, but instead identifies the requested characteristics of the network slice, such as a requested maximum latency, a requested charging rate (e.g., an unmetered network slice), a network slice associated with a specified enterprise, a carrier-branded network slice, and the like, or any combination thereof. The framework 232 compares the requested characteristics to the characteristics of the network slices 110, 111, and 112 and identifies one of these network slices as the requested network slice.

The permission control module compares characteristics of the requested network slice with permission criteria, as described further below with respect to FIG. 3, to determine whether the application 105 is permitted to access the requested network slice. If not, the framework 232 notifies the application 105 that the request is denied and does not instruct the modem 235 to negotiate a communication session with the requested network slice. If the permission criteria indicate that the application does have permission to access the requested network slice, the framework 232 communicates with the modem 235 to establish a PDU session with the requested network slice and binds the network request to the established PDU session. The application 105 then communicates with the requested network slice via the bound PDU session.

As noted above, in some embodiments, the application 105 does not request a specific network slice, but instead indicates to the framework 232 characteristics of the network slice to which the application is to be connected. In response to determining that the application 105 is permitted to access a network slice with the requested characteristics, the framework 232 determines traffic descriptor components associated with the requested characteristics. In some embodiments, the traffic descriptor components are data structures that describe the aspects of the network slice requested by the application 105, such as connection capability, Data Network Name (DNN), and the like, or any combination thereof.

The framework 232 performs UE Route Selection Policy (URSP) traffic matching, according to the communication protocol associated with the network system 106, to determine a set of URSP rules corresponding to the traffic descriptor components. The framework 232 supplies the set of URSP rules to the modem 235. In response, the modem 235 performs route selection based on the URSP rules to identify one of the network slices 110, 111, and 112. The modem 235 establishes a PDU session with the identified network slice and notifies the framework 232 of the PDU session.

In response, the framework 232 binds the PDU session with the network request issued by the application 105. The application 105 then uses the bound PDU session to communicate data with the identified network slice.

Figure 3:
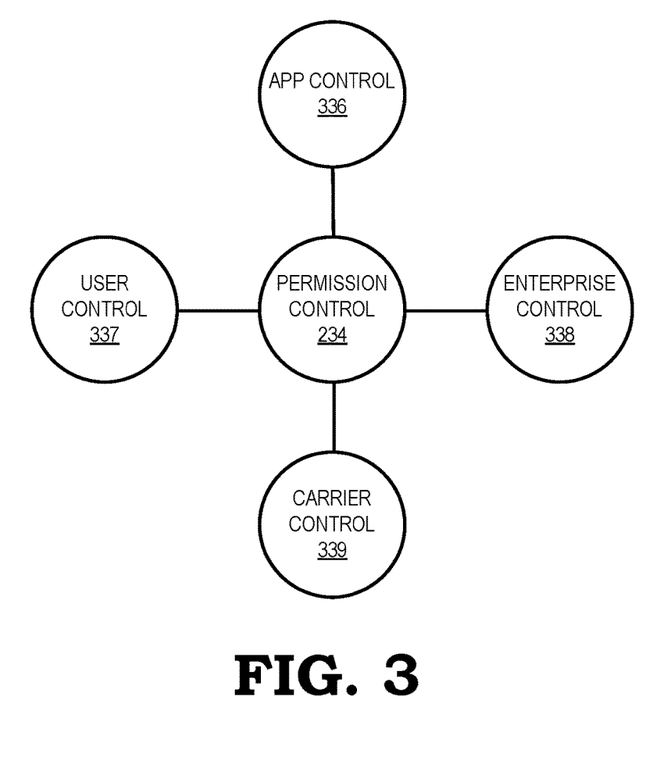
FIG. 3 is a block diagram illustrating operation of a permission control module of the UE of FIG. 2 that controls access to selected network slices in accordance with some embodiments.

FIG. 3 is a block diagram illustrating the permission criteria employed by the permission control module 234 in accordance with some embodiments. In the illustrated example, the permission control module 234 employs permission criteria including application control settings 336, user control settings 337, enterprise control settings 338, and carrier control settings 339 to determine whether to grant an application access to a given network slice.

In some embodiments, the application control settings 336 are settings established by a developer of the application 105 to control the types of network slices to which the application 105 is permitted access. Accordingly, the developer sets the application control settings 336 to ensure that the application 105 does not have permission to access specified network slices associated with a particular service or combination of services. In some embodiments, a developer can set the application control settings 336 so that data associated with the application is not used for slice selection.

The user control settings 337 can be set by a user (e.g., via a settings mode of an operating system) of the UE 102 to control which applications access particular network slices of the network system 106. For example, in some embodiments the user can set the user control settings 337 to ensure that applications of relatively low importance to the user do not access network slices associated with a higher charging rate. Similarly, the user can set the user control settings 337 to ensure that applications to which the user ascribes a higher importance can access the network slices associated with the higher charging rate. For example, the user can set the user control settings 337 to ensure that a texting program that the user accesses frequently does not have permission to access a network slice associated with higher data charges in order to lower the user's overall connection costs with the network system 106. In other embodiments, the user can set the user control settings 337 so that an application is not permitted to request a network slice with a specific capability (e.g., a low-latency network slice).

The enterprise control settings 338 can be set by an enterprise associated with the UE 102, such as an enterprise that issued the UE 102 to a user. The enterprise control settings 338 thereby provide the enterprise a measure of control over how the UE 102 communicates with the core network 104. For example, in some cases the enterprise can supply the UE 102 with a set of security-sensitive applications. The enterprise can set the enterprise control settings 338 so that only a specified set of applications are permitted to request connection to a network slice associated with a specified service such as a security sensitive service.

The carrier control settings 339 can be set by a carrier associated with the network system 106 to regulate access by applications of the UE 102 to one or more network slices. For example, in some embodiments the carrier can set the carrier control settings 339 to ensure that applications executing at the UE 102 are able to access only network slices associated with a carrier plan assigned to the UE 102. To further illustrate, in some embodiments each of the network slices 110, 111, 112 can be assigned to different carrier plans, with each carrier plan associated with a different charging level. The carrier can set the carrier control settings 339 to ensure that applications executing at the UE 102 access only network slices that correspond to the user's carrier plan. In other embodiments, the carrier control settings 339 can be set so that only specified applications (e.g., carrier-branded service applications) are permitted to access specified network slices (e.g., network slices having a specified carrier certificate).

In some embodiments, a user of the UE 102 can subscribe to individual ones of the network slices 110, 111, and 112, and the carrier control settings 339 are set so that applications are not permitted to access network slices to which the user is not subscribed. The framework 232 can employ URSP traffic matching and Network Slice Selection Assistance Information (NSSAI) to determine whether a network request targets a network slice to which the user is subscribed. If the network request targets an unsubscribed network slice, the framework 232 can deny the request.

In some embodiments, one or more of the permission criteria can vary based on device conditions of the UE 102. For example, in some embodiments the framework 232 can employ different permission criteria based on whether the UE 102 is in a low- power mode, on whether a screen of the UE 102 is in an active (or "on") state or an inactive (or "off") state, whether an application is executing in the foreground or background, and the like. Thus, for example, the permission criteria can be set so that an application is not permitted to access a particular network slice when the application is executing in the background, but is permitted to access the network slice when the application is executing in the foreground of the UE 102.

Figure 4:
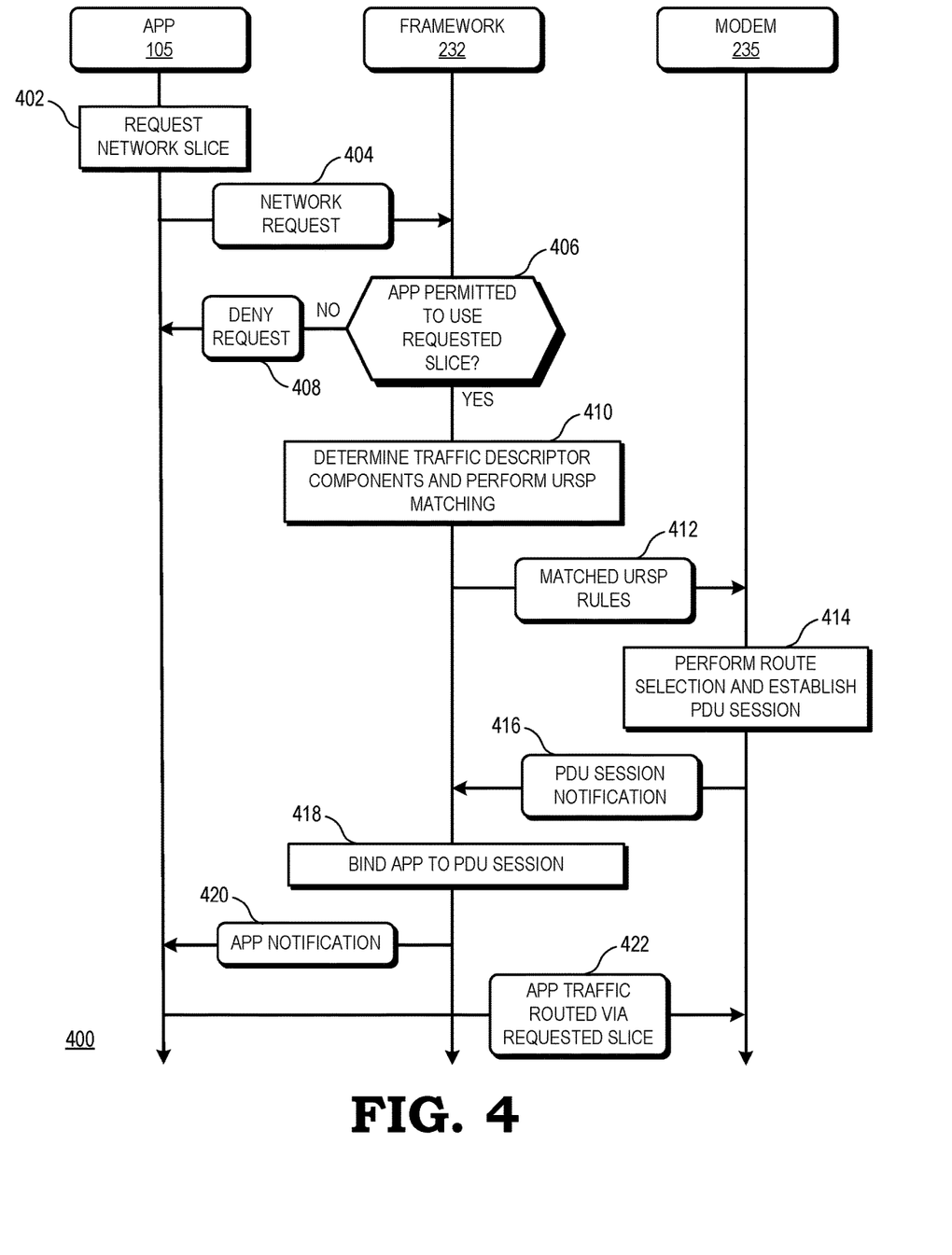
FIG. 4 is a flow diagram illustrating a method of the UE of FIG. 1 requesting access to a network slice in accordance with some embodiments.

FIG. 4 illustrates a flow diagram of a method 400 of accessing a requested network slice at a user equipment in accordance with some embodiments. For purposes of description, the method 400 is described with respect to an example implementation at the UE 102 of FIG. 1. At block 402, the application 105 determines the network characteristics of a network slice to be accessed, such as latency, bandwidth, security, charging rate, and the like, or any combination thereof. At block 404, the application 105 issues, to the framework 232, a network request indicating the network characteristics identified at block 402.

At block 406 the framework 232 determines, based on the network request and the permission criteria (e.g. the app control settings 336, the user control settings 337, the enterprise control settings 338, the carrier control settings 339), whether the application 105 has permission to access a network slice of the type characteristics indicated by the network request. If not, the method flow proceeds to block 408 and the framework 232 notifies the application 105 that access to the requested network slice has been denied. In some embodiments, the framework 232 notifies the application 105 of the request denial explicitly, such as by sending the application 105 a specified code indicating a connection failure. In other embodiments, the framework 232 notifies the application 105 of the request denial implicitly, such as by not sending a specified message (e.g., a network callback message) to the application 105. Furthermore, in some embodiments, in response to a denial of permission to connect to the requested network slice, the framework 232 instructs the modem 235 to establish a PDU session with a specified default network slice. The framework 232 binds the application 105 to the PDU session with the default network slice, and the application 105 communicates with the core network 104 via the PDU session with the default network slice. In other embodiments, it is left to the application 105 to determine how to handle a denial of the network request.

Returning to block 406, if the framework 232 determines that the application 105 does have permission to access a network slice indicated by the network request, the method flow proceeds to block 410 and the framework 232 determines a set of traffic descriptor components corresponding to the network characteristics indicated by the network request. In some embodiments, the traffic descriptor components include one or more of an operating system identifier identifying an operating system of the UE 102, an application identifier identifying the application 105, a Data Network Name (DNN) associated with the UE 102, one or more data fields indicating the connection capabilities of the UE 102, and the like. In some embodiments, the application identifier is assigned to the application 105 by an operating system of the UE 102. Further, in some embodiments the operating system does not assign a unique identifier to the application 105, but instead assigns each application a general operating system (OS) application identifier that identifies a type of the application (e.g., a game application, a texting application, a social media application, and the like). For example, the OS application identifier can be defined as the NET_CAP_XXX (such as low_latency, enterprise, and the like) requested by the application. The framework 232 can store a table or other data structure that establishes a one-to-one correspondence between each general OS application identifier and based on the traffic descriptor components, the framework 232 performs URSP matching, according to the network protocol associated with the network system 106, to generate a set of URSP rules. For example, in some embodiments, the framework 232 generates the URSP rules by performing URSP matching according to a Fifth Generation (5G) wireless communication protocol.

At block 412, the framework 232 provides the set of matched URSP rules to the modem 235. In response, at block 414 the modem 235 performs route selection based on the provided set of matched URSP rules and according to the network protocol associated with the network system 106. Based on the route selection, a PDU session is established with the network slice indicated by the route selection.

In some embodiments, one or more aspects of route selection can be performed by the framework 232 instead of the modem 235. For example, in some embodiments the framework 232 connects the application to a Wi-Fi connection to communicate data to the core network 104 in response to determining that the Wi-Fi connection is available at the UE 102. In other embodiments, the framework 232 determines if there is an existing PDU session with a network slice that matches a route selection rule corresponding to the URSP rules and, if such a PDU session exists, binds the network request provided by the application 105 to the existing PDU session, thereby connecting the application 105 to the network slice. In still other embodiments, the framework 232 can determine the route selection rule itself and can request the modem 235 to establish a PDU session corresponding to the route selection rule.

At block 416 the modem 235 notifies the framework 232 of the established PDU session with the network slice. In response, at block 418 the framework 232 binds the PDU session with the network request received at block 404. At block 420, the framework 232 notifies the application 105 of the bound PDU session. In response, at block 422 the application 105 communicates data to the network slice via the established PDU session, and thus communicates data with a network slice corresponding to the network request.

In some embodiments, the framework 232 can identify a specific NSSAI for one of the network slices 110, 111, and 112 from a list of available NSSAIs, wherein the identification is based on one or more of historical usage patterns of the application 105, historical patterns in the connections of the application 105 to the network slices 110, 111, and 112, and the context in which the application 105 is executing. In some embodiments, the framework 232 generates the list of available NSSAIs from a set of NSSAIs passed by the modem 235, wherein the set can include allowed NSSAIs, configured NSSAIs, rejected NSSAIs, and default configured NSSAIs. The modem 235 can then send a message to the network system 106 to request connection to the network slice with the specified NSSAI.

In some embodiments, the application 105 can be configured to establish different communication streams, wherein each communication stream can have different network performance characteristics. To illustrate via an example, a social media application can be configured to establish a low-latency communication stream for user chat communication, and to establish a high-bandwidth communication stream for video playback. Accordingly, in some embodiments the UE 102 can implement the method 400 for each communication stream of the application 105, so that different communication streams can be communicated via different ones of the network slices 110, 111, and 112. For example, the UE 102 can implement the method 400 to establish a connection between the application 105 and the network slice 110 to communicate user chat data, and employ another instance of the method 400 to establish a connection between the application 105 and the network slice 111 to communicate video data or other data associated with video playback. Further, in some embodiments the UE 102 can establish these connections with the different network slices so that the application communicates with different ones of the network slices 110, 111, and 112 concurrently.

In some embodiments, the network slices that are available at the network system 106 can change over time, such as based on changes to the configuration of the network system 106, based on changes at the UE 102 (e.g., based on a different user logging in to the UE 102), and the like, or a combination thereof. In response to detecting a change in the set of available network slices, such as by receiving a notification from the network system 106 that a network slice has been added or removed from the network system 106, the framework 232 can notify the application 105. In response, the application 105 can issue a new network request, such as a request to connect to a newly available network slice. Similarly, if a network slice to which the application 105 is connected becomes unavailable, the framework 232 can notify the application 105 so that the application 105 can take remedial action.

In some embodiments, the application 105 can provide a hierarchy of network requests at block 402 of the method 400. For example, the network request can request connection to a specified network slice, referred to as a special service slice, and can further request connection to a different network slice, referred to as a default network slice, when the special service slice is not available (e.g., such as when the application 105 is denied permission to access the special service slice). Thus, when the special service slice is available to the application, the framework 232 connects the application to the special service slice and notifies the application 105. When the special service slice is not available to the application, the framework 232 automatically connects the application 105 to the default network slice and notifies the application. When the special service slice changes status from available to unavailable (such as due to a change in the permission criteria or a change at the network system 106), the framework 232 automatically terminates the connection with the special service slice, connects the application 105 to the default network slice, and notifies the application 105 of the change. When the special service slice changes status from unavailable to available (such as due to a change in the permission criteria or a change at the network system 106), the framework 232 automatically terminates the connection with the default network slice, connects the application 105 to the special service slice, and notifies the application 105 of the change.

Figure 5:
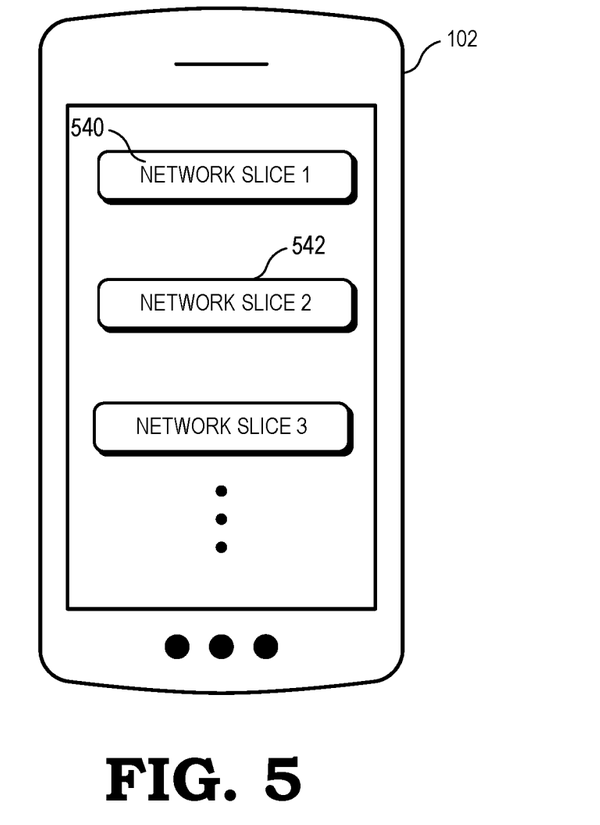
FIG. 5 is a block diagram illustrating an example of the UE of FIG. 1 presenting a graphical user interface supporting selection of an available network slice in accordance with some embodiments.

In some embodiments, the UE 102 is configured to provide the user with a selectable list of the available network slices, and to connect to a network slice selected by the user from the provided list. An example is illustrated at FIG. 5 in accordance with some embodiments. In the illustrated example, the UE 102 displays a list of network slice options (e.g. option 540, 542) with each of the network slice options corresponding to an available network slice of the network system 106.

In some embodiments, an operating system of the UE 102 generates the list of network slice options by controlling the modem 235 to obtain slice identifiers for each available slice from the network system 106. A network carrier associated with the UE 102 provides the operating system with a map of the slice identifiers to one or more descriptive service plans. For example, in some embodiments the network carrier provides the operating system with the map via an over-the-air (OTA) configuration process, via an Open Mobile Alliance Device Management (OMA-DM) process (e.g., by indicating the service plan associated with an enhanced mobile broadband (eMBB) slice service type (SST) identifier), and the like, or a combination thereof. The operating system generates each of the displayed network slice options to show a given network slice and a corresponding descriptive service plan. The descriptive service plan can indicate any of a variety of plan characteristics, such as one or more charging rates, bandwidth limitations (e.g., a bandwidth cap), and the like.

The user of the UE 102 can select one of the displayed options via a touchscreen interface, via an input device such as a computer mouse interface, or via another user interface. In response to the user selecting a network slice option, the framework 232 generates a slice request to connect the UE 102 to the corresponding network slice. In some embodiments, in response to the user selecting a network slice option, the operating system generates a network request that is processed by the framework 232 and the modem 235 in similar fashion to the method 400 described above with respect to FIG. 4. The UE 102 is thereby connected to a network slice selected by the user, providing the user with greater control over operation of the UE 102, and improving the overall user experience.

In some embodiments, the displayed options indicate service plans associated with each network slice, and can indicate the cost of each service plan, whether a particular service plan represents an upgrade in service plan for the user, and the like. In response to selecting an option for a network slice that is associated with a change in the service plan, the UE 102 sends a service plan change request to the network system 106. In response, the network system 106 can change the service plan associated with the UE 102. Thus, a carrier can give the user the option to change service plans in order to connect to a particular network slice, allowing the user more flexibility while permitting the carrier to set different prices for different network slice capabilities.

In some embodiments, instead of providing selections for particular network slices, the display options provide permission settings for applications that can be adjusted by the user. For example, by selecting a particular option, the user can change the permission associated with a given application to permit or deny the application permission to connect to a particular network slice. In response to the user selecting an option, the framework 232 makes the corresponding adjustment to the user control settings 337, allowing the permission control module 234 to permit or deny an application access to a given network slice based on the user selection.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   at a user equipment (UE), receiving from an application a network request to access a network slice selected from a plurality of network slices of a network; and
   in response to the network request: verifying, at the UE and based on permission criteria associated with the application, that the application is permitted to access the selected network slice; and
   establishing, at the UE and based on verification of the permitted access, a communication session with the selected network slice.

2. The method of claim 1, wherein the permission criteria include an application permission criterion set by a user of the UE.

3. The method of claim 1, wherein the permission criteria include an application permission criterion set by a carrier of the network.

4. The method of claim 1, wherein the permission criteria include an application permission criterion set by an enterprise associated with the UE.

5. The method of claim 1, wherein establishing the communication session comprises:
   determining a set of traffic descriptor components based on the network request; and
   performing traffic matching, based on the traffic descriptor components, to identify the network slice.

6. The method of claim 5, wherein performing traffic matching comprises matching the traffic descriptor components with a set of UE Route Selection Policy (URSP) rules to identify a matched subset of the URSP rules.

7. The method of claim 6, wherein establishing the communication session comprises:
   performing route selection at the UE based on the matched subset of URSP rules; and
   establishing a Protocol Data Unit (PDU) session based on the route selection.

8. The method of claim 7, wherein establishing the communication session comprises:
   binding the network request with the established PDU session.

9. A method comprising:
   providing, at a user equipment (UE), a list of available network slices associated with a network connected to the UE;
   responsive to provision of the list, receiving a selected network slice for use by an application;
   verifying, at the UE and based on permission criteria associated with the application, that the application is permitted to access the selected network slice; and
   establishing, at the UE, a communication session with the selected network slice.

10. The method of claim 9, wherein providing the list of available network slices comprises providing an indication of one or more capabilities associated with one or more of the available network slices.

11. A user equipment (UE), comprising:
    a framework to:
        receive, from an application, a network request to access a network slice selected from a plurality of network slices a network; and verify, based on permission criteria associated with the application, that the application is permitted to access the selected network slice; and a modem to, in response to the network request, establish a communication session with the selected network slice based on the verification of the permitted access.

12. The UE of claim 11, wherein the permission criteria include an application permission criterion set by a user of the UE.

13. The UE of claim 11, wherein the permission criteria include an application permission criterion set by a carrier of the network.

14. The UE of claim 11, wherein the permission criteria include an application permission criterion set by an enterprise associated with the UE.

15. The UE of claim 11, wherein the framework is to:
determine a set of traffic descriptor components based on the network request; and
perform traffic matching, based on the traffic descriptor components, to identify the network slice.

16. The UE of claim 15, wherein the framework is to perform traffic matching by matching the traffic descriptor components with a set of UE Route Selection Policy (URSP) rules to identify a matched subset of the URSP rules.

17. The UE of claim 16, wherein the modem is to establish the communication session by:
performing route selection at the UE based on the matched subset of URSP rules; and
establishing a Protocol Data Unit (PDU) session based on the route selection.

18. The UE of claim 17, wherein the framework is to establish the communication session by:
binding the network request with the established PDU session.

19. A user equipment (UE) comprising:
a framework configured to:
provide, at the UE and to an application executing on the UE, a list of available network slices associated with a network connected to the UE; and
responsive to provision of the list, verify, at the UE and based on permission criteria associated with the application, that the application is permitted to access the selected network slice; and
a modem to establish, at the UE and based at least in part on the verification, a communication session with the selected network slice.

20. The UE of claim 19, wherein the framework is to provide the list of available network slices by providing an indication of one or more capabilities associated with one or more of the available network slices.

21. A non-transitory computer-readable storage medium comprising instructions that, when executed by one or more processors, causes a method according to claim 1 to be performed.

* * * * *